(No Model.) 2 Sheets—Sheet 1.

J. W. BARTLETT.
MACHINE FOR SHRINKING TIRES ON WHEELS.

No. 285,553. Patented Sept. 25, 1883.

Witnesses
Louis F. Gardner
J. W. Gardner

Inventor
J. W. Bartlett
per
J. A. Lehmann,
Atty (No Model.) 2 Sheets—Sheet 2.

J. W. BARTLETT.
MACHINE FOR SHRINKING TIRES ON WHEELS.

No. 285,553. Patented Sept. 25, 1883.

Witnesses.
Louis F. Gardner
J. W. Garner

Inventor.
J. W. Bartlett,
per
F. A. Lehmann,
Atty.

UNITED STATES PATENT OFFICE.

JOHN W. BARTLETT, OF MOLINE, ILLINOIS.

MACHINE FOR SHRINKING TIRES ON WHEELS.

SPECIFICATION forming part of Letters Patent No. 285,553, dated September 25, 1883.

Application filed April 14, 1883. (No model.)

*To all whom it may concern:*

Be it known that I, JOHN W. BARTLETT, of Moline, in the county of Rock Island and State of Illinois, have invented certain new and useful Improvements in Machines for Shrinking and Upsetting Tires; and I do hereby declare the following to be a full, clear, and exact description of the invention, such as will enable others skilled in the art to which it pertains to make and use it, reference being had to the accompanying drawings, which form part of this specification.

My invention relates to an improvement in tire shrinkers and upsetters; and it consists in the combination of a circular bed-plate that is adapted to receive the wheel to which the tire is to be applied, and which has cam-surfaces formed upon the inner side of a bearing-flange, with a pivoted rotating connecting-plate having cam-blocks secured to it, which bear upon the cams formed in the flange of the bed-plate, and suitable mechanism for imparting and reversing motion to the connecting-plate, all to be more fully set forth hereinafter.

Figure 1:
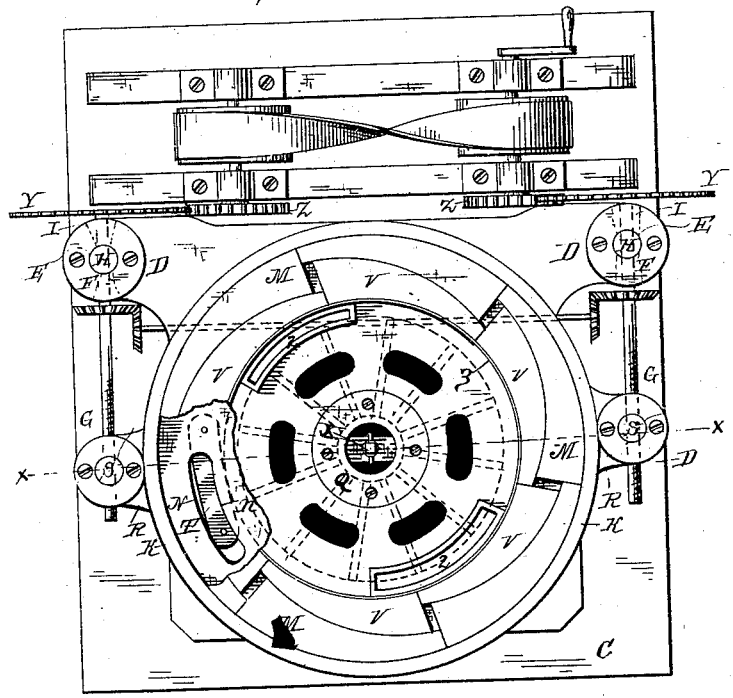
Figure 2:
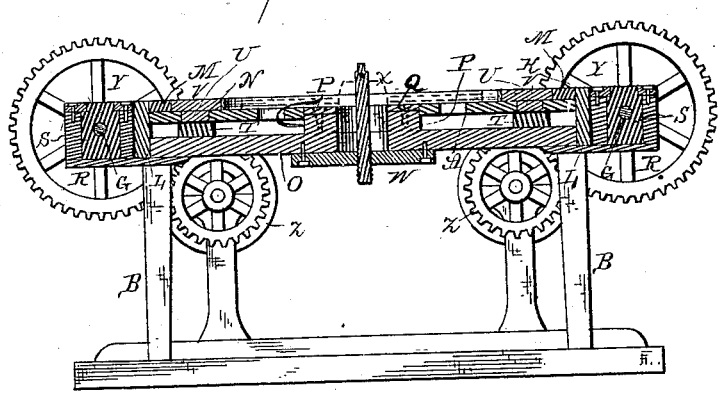
Figure 3:
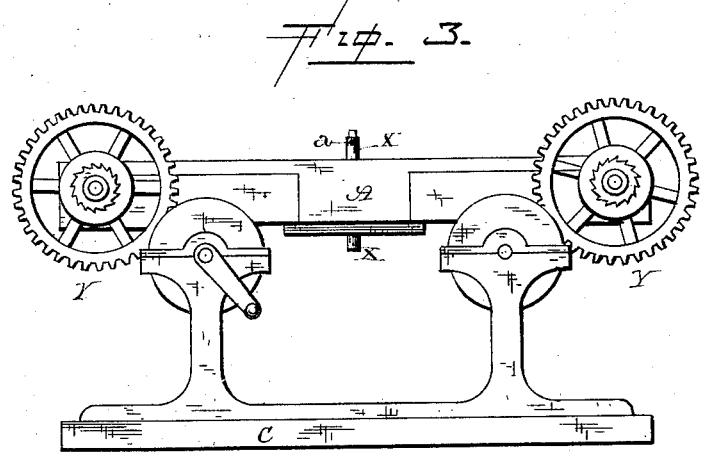
Figure 4:
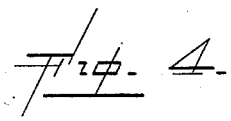

In the accompanying drawings, Figure 1 represents a top plan view of my invention, with a portion of the bed-plate broken away, so as to expose the connecting-plate and its attachments. Fig. 2 is a vertical cross-section on the line X X, Fig. 1. Fig. 3 is a side elevation. Fig. 4 is a detailed perspective view of the cam-blocks and their connecting-links.

A represents a circular bed-plate, which is supported upon legs B at a suitable distance above the base C. Projecting from this bed-plate on a line with each other are the brackets D, which are provided with circular recesses E and bearing-plates F, by means of which the actuating-screws G, which are swiveled in the circular blocks H, can be pivotally secured in position, the brackets being also provided with a groove, I, across their faces, of sufficient width to allow for the play of the screws G. This bed-plate is formed with a circular flange, K, which extends above its upper face a suitable height, and with a second circular flange, L, which projects below its lower surface a suitable distance, as shown at Fig. 2. Formed on the inner side of the flange K are the tangential cams M, of equal length, which extend entirely around the inner circumference of the flange, and through the bed-plate, equidistant from the ends of the cams, are cut the tangential slots N, the inner sides, *n*, of which are in a line with the bearing-faces of the cams. In the center of the bed-plate is made a circular opening, in which the connecting-plate O is pivoted by means of the hub P, which is formed integrally with it and the circular cap-plate Q, which rests upon a shoulder formed in the opening and is secured to the hub P by means of bolts and screws. The flange L has portions of it cut away on opposite sides of the bed-plate, to admit of the passage and movement of the brackets R, which project from opposite sides of the connecting-plate. These brackets are provided with circular recesses and bearing-plates, to admit and secure the blocks S, through which the screws G pass. Pivoted to the upper side of the connecting-plate are the links T, corresponding in number to the cams and slots. The outer ends of the links are secured to the under sides of the downwardly-projecting lugs U of the cam-blocks V, the said lugs being of a size and shape to enable them to fit into and reciprocate in the tangential slots N. These cam-blocks are slightly shorter than the cams against which they bear, have their outer sides tangential in form, their inner sides being arcs of a circle drawn from the center of the bed-plate, thus making them wedge-shaped, as shown at Figs. 1 and 4. Secured to the under side of the connecting-plate, at the center thereof, is a yoke, W, from the center of which, and exactly in the center of the bed-plate, projects upwardly a rod, X, the lower end of which is screw-threaded. The function of the rod is to act as a spindle upon which the wheel is placed that is to be operated upon. This rod holds the wheel down in place while the tire is being swaged on the wheel, and is made screw-threaded, so that it can be adjusted vertically, for the purpose of regulating the amount of dish that shall be given to the wheel. The rod is screwed up or down, so as to suit the length of the hub, the cross rod or key, which is secured to the upper end of the rod, being left about five-eighths of an inch above the top of the hub when the wheel is lying upon the top of the machine, as shown in dotted lines. When the tire is being shrunk on the wheel, the spokes will spring, and the hub rises upward until its upper end strikes against the cross-rod. This upward movement of the hub limits the amount of dish that is given to the wheel. The outer ends of the screw-rods G have spur-wheels Y keyed to them, with which spur-wheels mesh the pinions Z, which are keyed to shafts that are journaled in suitable brackets made fast to the base or platform of the machine. These shafts have also pulleys keyed to them, which pulleys are connected by a cross-belt. Motion is imparted to the machine, either by a crank or from steam or other power, in the usual way. In operation the tire to be shrunk is placed on the bed-plate inside the cam-blocks and bearing against them, being represented at Fig. 1. Where the wheels are quite small, the circular blocks 2 2 are placed inside of the cams V, so as to decrease the size of the circle in which the wheel is placed. These blocks then bear directly against the tire of the wheel, instead of the cams V. Motion is imparted to the machine, and by reason of the actuating-screws, the connecting-plate, the slots in the bed-plate, and the connecting-links the cam-blocks are caused to move inwardly as the connecting-plates rotate until the tire is compressed the requisite degree, the pressure of the cam-blocks on the tire being so exactly equal as to keep it perfectly circular throughout the entire operation.

In order to adapt the machine to wheels of different sizes, I provide the bearing-blocks 2, which are to be secured inside the cam-blocks, and thus reduce the size of the circle formed by the cam-blocks to any diameter desired. Experiments have demonstrated that one wheel per minute can be operated upon by the use of the machine, thus saving a vast deal of time over the methods now commonly employed in performing this work.

Having thus described my invention, I claim—

1. In a tire-setting machine, a bed-plate provided with tangential circumferential cams, in combination with a connecting pivoted plate, having cam-blocks connected to it which bear against the cams, and mechanism for rotating said plate, substantially as shown and described.

2. In a tire-setting machine, the combination of the slotted bed-plate, the flange K, placed around the bed-plate, the cams N, which extend around the inner circumference of the flanged connecting-plate O, links T, which are connected at their outer ends with the cams, cam-blocks V, cams M, placed inside of the flange K, and suitable mechanism for operating the parts, substantially as described.

In testimony whereof I affix my signature in presence of two witnesses.

JOHN W. BARTLETT.

Witnesses:
J. T. BROWNING,
J. S. RICHARDS.